3,271,381
POLYMERIZATION OF OLEFINS BY USE OF MODIFIED CATALYSTS
Harry M. Andersen and William R. Richard, Jr., Dayton, Ohio, assignors to Monsanto Company, a corporation of Delaware
No Drawing. Filed Sept. 15, 1958, Ser. No. 760,858
6 Claims. (Cl. 260—94.9)

This application is a continuation-in-part of our copending application Serial No. 695,153 filed November 7, 1957, and now Patent No. 3,163,611.

This invention relates to the low pressure polymerization of olefins in the presence of catalysts exemplified by trialkyl-aluminum/titanium tetrachloride. The invention is directed to the use of strong acids as modifiers in such polymerizations.

The catalysts employed in the present invention are a combination of a reducing agent, particularly an organometallic reducing agent such as the organic compounds of metals of Groups I to III of the Periodic Table, with a metal halide of Groups IV–B, V–B and VI–B of the Periodic Table as represented by:

$$MeX_n$$

in which Me represents a metal of the designated groups, X represents a halogen and $n$ represents the valence of the metal. X in the above formula will ordinarily be chloride, but other halides such as bromides, iodides and fluorides can also be employed. It is also within the scope of the present invention to substitute alkoxy groups for one or more of the halide atoms in the above formula, for example, methoxy groups. As the metal, Me, titanium is ordinarily employed, but vanadium, zirconium and chromium are also especially suitable. As the organometallic reducing compound for use with the above metal halides, aluminum compounds are generally employed which have the general formula $RAlX_2$, where R is hydrogen or hydrocarbon, X means any other substituent including hydrogen or hydrocarbon; particularly included are dialkyl or diaryl aluminum monohalides, also aluminum hydrides, alkyl or aryl aluminum dihydrides, dialkyl or diaryl aluminum hydrides, alkyl or aryl alminum dihalides, alkyl, or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds, such as $C_2H_5ZnI$ and zinc dialkyls, all of these, of course, being reacted with the above designated halides of Groups IV–B, V–B or VI–B metals. Another of the classes of applicable polymerization catalysts comprises compounds of the above designated halides of Groups IV–B, V–B and VI–B heavy metals combined with the alkali metal alkyls, for example, with lithium-, sodium-, or potassium methyl, -ethyl, -benzyl, -isobutyl, or with complex compounds such alkali metal alkyls with organic compounds of aluminum, magnesium or zinc as mentioned above or complex compounds of alkali metal hydrides with such organic compounds of aluminum, magnesium or zinc, for example, butyl lithium plus zirconium tetrachloride, sodium tetramethylaluminum plus titanium tetrachloride or plus vanadium tri- or tetra-chloride.

There have recently come into comercial prominence processes for the low pressure polymerization of ethylene and other monomers, particularly other α-olefins, to obtain polymers having a high degree of crystallinity. These low pressure polymers which are commonly referred to a Ziegler, or Ziegler-type polymers have certain advantages over polymers of lesser crystallinity, particularly with respect to greater rigidity and higher softening and melting points. The importance of these and other advantages is so well recognized as to require no extended discussion here. However, despite their many advantages, the so called Ziegler polymers have certain defects among which is the fact that if the monomer is polymerized in the presence of the unmodified catalyst, such high molecular weight materials may be obtained that they are intractable and difficult to process. The catalyst employed in the polymerization of ethylene can be modified in various ways to cause the production of lower molecular weight polyethylene. However, many of these methods cause a corresponding loss in the impact properties of the resulting polymer.

It has now been found that strong acids, particularly strong inorganic acids, have a marked effect in causing lowering of the molecular weight of polyethylene if such acids are combined with the catalyst as described herein and employed in the production of such polyethylene. Moreover, the employment of such acids not only lowers the molecular weight, as measured by an increase in the melt index of the polymer, but it does so without appreciably affecting the density of the polymer. As increased density is apparently related to the loss of impact strength resulting from the use of other types of modifiers to lower molecular weight, it follows that the present procedure provides a method of controlling molecular weight in order to obtain good processing characteristics, while still retaining good impact characteristics.

The catalysts which are employed in modified form in the process of the present invention belong to that particular group of organometallic catalysts commonly referred to as Ziegler catalysts, and in the modified catalysts as defined herein can be emploeyd in any of the polymerizations for which Ziegler catalysts are suitable. The monomers employed in such polymerizations can properly be referred to as Ziegler-polymerizable monomers; in particular the modified catalysts as defined herein can be employed in the polymerization of α-olefines, particularly the α-olefines of about 2 to 10 carbon atoms. The invention is especially of interest of course in the production of solid polymers of sufficiently high molecular weight to be useful in the plastics industry, but the benefits of the invention are obtainable in preparing lower molecular weight Ziegler semi-solid and even liquid polymers which can be used, for example, in adhesives, lube oil additives, etc. Preferred polymers have a molecular weight of at least 2000 and preferably of at least 10,000. Those Ziegler polymers to which the preparation of the present invention is applied with particular advantage generally have much higher molecular weights, ranging from 20,000 to 50,000 or 100,000 or even in many cases as high as 1,000,000 to 3,000,000 or more; this is not to say that polymers of all of the mentioned molecular ranges have equal value, but the present invention is useful in altering and controlling molecular weights within all of the mentioned ranges. The molecular weights in question are those calculated in the conventional manner on the basis of the viscosity of the polymer in solution as described in the Journal für Praktische Chemie, 2nd Series, vol. 158, page 136 (1941) and Journal of the American Chemical Society, 73, page 1901 (1951).

At the present time, ethylene is the preferred monomer for preparing Ziegler polymers, although propylene is also of great interest. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial No. 502,008, filed April 18, 1955, and now abandoned. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler-type catalysts are also of great interest, having exceptional low temperature properties, as disclosed in the copending application of Robert J. Slocombe, Serial No. 502,189, filed April 18, 1955. Other ethylenically unsaturated hydrocarbons whose Ziegler polymers are of potential interest include propylene, butylene, especially butene-1, amylenes and the like. Substituted olefins are also of interest, such as vinylcyclohexene, styrene, vinylnaphthalene, vinyl aromatic hydrocarbons generally, etc. Styrene when polymerized in the presence of Ziegler type catalysts gives a high molecular weight polymer showing a crystalline structure by X-ray diffraction examination. Ziegler type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending applicaiton of Earl W. Gluesenkamp, Serial No. 507,717, filed May 11, 1955, Patent No. 3,026,-290. A variety of copolymers of the various monomers named above with each other and with other comonomers can be prepared by Ziegler catalysis, the present invention in its broadest scope includes the polymerization of all such monomers and in fact is adapted to the polymerization of any single monomer or mixture of monomers polymerizable with such catalysts.

Despite the broad scope of the invention, it will be found more convenient in most of the present application to discuss the invention with specific reference to preferred embodiments thereof, and according, the preparation of Ziegler-type polyethylene will be especially referred to by way of example. Likewise, referred to especially by way of example will be catalysts prepared by the interaction of a trialkylaluminum with titanium tetrachloride, this being a preferred example of the preferred group of catalysts which are those prepared by interaction of (a) an aluminum compound of the general formula $R_2AlX$ wherein R is an alkyl, cycloalkyl, or aryl radical and X is hydrogen, halogen, or an alkyl, cycloalkyl, or aryl radical, with (b) an inorganic metal halide selected from the group consisting of the chlorides, bromides and iodides of titanium, vanadium, zirconium and chromium.

In accordance with one embodiment of the present invention, an active catalyst is prepared, usually but not always as a dispersion in an inert organic liquid, and there is added to such catalyst a strong acid in an amount effective to beneficiate, that is, to beneficially modify the catlyst, but not in amount which would destroy its activity. An alternative procedure comprises adding the strong acid to the inorganic metal halide catalyst precursor, and interacting the thus-treated precursor with a reducing agent effective to produce an active low pressure polymerization catalyst. A suitable amount of acid will vary somewhat dependent upon the particular catalysts and the degree of modification desired, but in general the amount is in the neighborhood of 1 to 3 gram-equivalents of acid per gram-atom of the multivalent metal halide in the metal halide that is reduced in preparing the catalyst, for example, $TiCl_4$. By gram-equivalent of the acid, is meant the amount of acid which will provide 1 gram of hydrogen ion. Too little of an acid will not achieve the desired effect, but on the other hand so great an amount cannot be used that the catalyst activity is completely destroyed. The presence of acids can decrease the catalytic activity somewhat, but in some instances this is desirable and in other instances, in accordance with certain aspects of the invention, we can readily overcome this effect partially or completely by alteration in reaction conditions, especially by imposing moderate pressure. The ratio of the reducing component of the catalyst to the inorganic metal halide therein also effects the molecular weight, and it is possible to vary this ratio along with the amount of acid in order to achieve the desired effect.

In general, any strong acids are considered suitable for use herein, so long as they are not capable of violent reaction with the catalyst or catalyst components to produce materials which do not have catalytic effect, or of otherwise interfering with the polymerization or causing degradation of the resulting polymers. Common commercial acids which are suitable are hydrochloric acid, sulfuric acid, and phosphoric acid. Hydrogen chloride as used herein is ordinarily in anhydrous form and in this form it may be questioned whether it can properly be considered as belonging to the same class of acids as the other materials employed; however, anhydrous hydrogen chloride has been found suitable for use in the manner disclosed herein. A sulfuric acid will ordinarily be employed in about 95% concentration, and the phosphoric acid in about 85% concentration, but it will be realized that it is within the scope of the present invention to raise or lower these concentrations as well as to use hydrochloric acid in aqueous form; for water itself also has an effect in causing variation in the molecular weight of polymer produced over the catalyst as defined herein, and the ratio of water to acid and the ratio of the combination of both the water and acid to the other catalyst components can be regulated in order to produce the desired alternation in molecular weight of the polymer. Various other acids can be employed such as anhydrous hydrogen bromide, sulfonic acids, particularly such organosulfonic acids as benzenesulfonic acid, toluene sulfonic acid, etc., potassium acid sulfate, sulfurous acid, and various other strong inorganic acids. However, it would be preferred to avoid nitric acid, as while it could provide hydrogen ion, it could also cause various side effects. While inorganic acids are preferred, strong organic acids would have a similar effect, for example, trichloroacetic acid. It is especially surprising to find that an acid as strong as and as reactive as sulfuric acid can be tolerated by a catalyst in a polymerization of the type with which the present process is concerned, and especially in such quantities as to provide about 2 or more hydrogen ions per atom of titanium or other Group IV to VI metal. With respect to the polybasic acids employed herein, particularly sulfuric acid and phosphoric acid, it will be realized that they can be employed in the form of their acid metal salts, particularly their acid alkali and alkaline earth metal salts, so long as they provide hydrogen ion readily enough to be classified as a strong acid.

In general, it can be stated that any substantial amount of acid which does not completely deactivate the catalyst will have some effect on the molecular weight of the polymer prepared with the catalyst. A catalyst of the type employed herein can be considered deactivated for most purposes if it is incapable when suspended in a well-agitated inert solvent in concentration of about 20 millimoles per liter (based on the multivalent metal) of causing an ethylene uptake rate of at least 1 gram per hour per liter of suspending liquid at 20 atmospheres' pressure; it is not usually practical to use a catalyst which does not have an uptake rate of at least 5–10 grams/hr./liter under such circumstances, and it is preferable that the uptake rate be 100 grams/hour/liter or higher. When the catalyst is employed under pressure and possibly at other concentrations, it should have an uptake rate of at least 25 grams/hour/liter under the conditions of employment, and preferably an uptake rate of 100 grams/hour/liter or higher. The ethylene uptake rates for any conditions can readily be ascertained. The catalyst employed herein are made up of compounds of inorganic polyvalent metal halides which are reduced by reducing agents, the former being exemplified by $TiCl_4$ and the latter being exemplified by trialkylaluminums. For each mole of the said heavy metal halide which is reduced, when the said compound contains 1 atom of metal per molecule, the amount of acid to be used will generally be within the range of 0.1 to 10 gram-equivalents.

The mole ratio of trialkylaluminum to titanium tetrahalide used in preparing the catalyst employed in the present invention can be used along with the presence of acid to effect control of molecular weight, the higher ratios producing higher molecular weights. The $R_3Al/TiCl_4$ mole ratios employed are generally in the range of about 0.3:1 to 0.8:1, although a higher or lower ratio can be used, for example, 0.1:1 to 3:1 or so. Amounts of acid to provide about 0.5 to 3 gram-equivalents per gram-atom of Ti are suitably employed.

The presence of acids in the polymerization medium often results in decreased catalyst activity which results in a decreased rate of reaction; this can be compensated for by a change in several reaction variables, such as by increasing the amount of catalyst, increasing the temperature, or increasing the pressure. We find a very modest increase in pressure, say from atmospheric up to 50 or 100 or 200 pounds per square inch gauge is usually quite sufficient to obtain adequate reaction rate. In the case of catalyst which require pressure in the first instance for a satisfactory rate of polymerization when being used to polymerize ethylene or other monomer, the pressure can be still further increased to restore the reaction rate which has been decreased because of the use of an acid. We ordinarily prefer to prepare an active Ziegler catalyst as a dispersion in an inert organic liquid, such as an aliphatic or aromatic hydrocarbon as will be discussed more in detail hereinafter. This dispersion is ordinarily a colloidal suspension of catalyst particles in the liquid. We then add the chosen acid in the chosen amount, and optionally the acid before addition is diluted somewhat with an organic liquid and the addition made with vigorous agitation so as to prevent localized concentration of acid during the treatment of the catalyst therewith. It is preferably in accordance with the invention to prepare an active catalyst first, and then to treat same with the chosen acid. Although less preferred, the acid can be added first to the heavy metal compound, e.g., $TiCl_4$, prior to its interaction with the reducing agent, e.g., trialkylaluminum. Ordinarily the monomer is polymerized in the presence of the catalyst dispersion which has been treated with acid. However, prior to the polymerization or other use of the catalyst, part or all of the solvent may be removed as by filtration, evaporation, and the like, care being taken not to use conditions for such a separation that will deactivate the catalyst. It is also possible, if a dry catalysts or catalyst in a reduced amount of organic liquid is to be used, to prepare the active catalyst in such form prior to its treatment with acid. In such event, particular care must be taken to insure thorough admixture of the chosen amount of acid with the total catalyst, and this can involve using a limited amount of inert organic liquid as a solvent and/or suspending agent for the chosen acid, or thorough grinding as by ball milling the catalyst, either in a dry condition or with some inorganic liquid present, with the chosen acid.

Ordinarily, it is quite sufficient and in fact desirable to use only a single acid. However, it is not outside the scope of the invention to utilize an admixture of two or more such compounds, or an admixture of any one or more such compounds with any other catalyst modifying agent that may be desired.

DETAILS OF PREPARATION AND USE OF ZIEGLER CATALYST

More detailed information will now be given on preferred procedures and components for preparing various Ziegler catalysts, and it will be understood that the procedures given above with respect to use of same with an acid will be followed. The catalysts can be prepared in the vessel in which the catalyzed reaction is to be carried out, or can be prepared in one vessel and then transferred to the intended reaction vessel, and in either event can either be used immediately after preparation, or after a period of time elapses between the preparation of the catalyst and its subsequent use to catalyze polymerization. If the catalyst is to be used after such a period of time, it is apt to lose activity during the storage period and/or produce polymer of an increased molecular weight as compared with that produced with fresh catalyst and these disadvantages can be minimized by storing Ziegler catalyst at temperatures below about 10° C. and preferably below −25° C., for fairly long storage periods, as disclosed and claimed in the copending application of Robert J. McManimie, Harry G. Hurst, and Edward H. Mottus, Serial No. 586,352, filed May 22, 1956, and now abandoned. While Ziegler catalysts are often conveniently prepared at room temperature, they can be prepared at higher temperatures, and also certain advantages are obtained, including uniform catalyst activity over the course of a reaction period and more effective removal of catalyst residues, if the catalyst is prepared at temperatures below about −25° C. as disclosed and claimed in the copending application of Robert J. McManimie, Harry G. Hurst and Edward H. Mottus, Serial No. 586,353, filed May 22, 1956, and now Patent No. 3,065,220.

Suitable aluminum compounds to be reacted with the inorganic chlorides, bromides and iodides of titanium, vanadium, chrominum or zirconium are those represented by the general formula $R_2AlX$ wherein R is an alkyl, cycloalkyl or aryl radical and X is hydrogen, halogen, or an alkyl, cycloalkyl, or aryl radical. By way of example, but not limitation, the following compounds are mentioned:

triethylaluminum
triisobutylaluminum
trioctylaluminum
didodecyloctylaluminum
diisobutylaluminum hydride
tridodecylaluminum
diphenylaluminum bromide
dipropylcyclohexylaluminum
ditolylmethylaluminum
tri-($\beta$-phenylethyl)aluminum
diethylaluminum chloride
diisobutylaluminum chloride
diisobutylaluminum iodide
di($\beta$-cyclohexylpropyl)isobutylaluminum It is to be understood that mixture of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkyl-aluminum sesquihalides.

The aluminum compounds in question are interacted with one or more inorganic chlorides, bromides, or iodides of titanium, vanadium, or zirconium, the chlorides and iodides being preferred. The titanium, vanadium or zirconium in these halides should be in a valence form higher than the lowest possible valence. The tetrahalides are especially preferred, although the mixtures of divalent halides, trivalent halides and pentavalent halides can be used. Titanium, vanadium or zirconium compounds called alcoholates, alkoxides, or esters by various investigators such as titanium tetramethoxide (also called tetramethyl titanate), titanium triethoxide, tripropoxytitanium chloride, methoxytitanium trichloride, zirconium, tetra-n-butoxide, etc., can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained. Although the exact action resulting from contacting the aluminum compound with the titanium or zirconium compound is not understood, it is believed likely that the zirconium or titanium halide is reduced in valence by the reaction of the added aluminum compound. The mol ratio of aluminum to titanium can vary over a wide range, suitable values being from 0.1:1 to 10:1 on up to 15:1 or higher. It is generally preferred to use an Al:Ti mol ratio between 0.3:1 and 5:1. The same ratios apply in the case of the other reducible metals.

While active catalysts can be prepared by a variety of procedures, the simplest and perhaps most effective is to add the inorganic titanium halide to the aluminum compound, or vice versa, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied ethane, propane, isobutane, normal butane, n-hexane, the various isomeric hexanes, n-heptane, i-octane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also benzene, toluene, ethylbenzene, cumene, decalin, ethylene dichloride, chlorobenzene, diethyl ether, p-dichlorobenzene, dibutyl ether, tetrahydrofuran, dioxane. In some instances it is also advantageous to prepare the catalyst in the presence of a monomer; for example, if the catalyst is prepared in the presence of liquid ethylene and then used to polymerize ethylene, a high yield of crystalline polyethylene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents, or inert organic liquids.

The amount of catalyst required is dependent on the other variables of the particular reaction, such as the polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.001.

When the polyvalent metal in the catalyst is titanium, the concentration of catalyst will ordinarily be from about 10 to 30 or 40 millimoles per liter of polymerization medium (calculated on the basis of titanium), although other ranges can be employed, e.g., from amounts less than about 5 to about 60 millimoles per liter or even stronger concentrations.

The polymerization can be effected over a wide range of temperatures, again the particular preferred temperature being chosen in accordance with the monomer, pressure, particular catalyst and other reaction variables. For many monomers from room temperature down to say minus 40° C. and even lower are suitable, and in many cases it is preferred that the temperature be maintained at below about 35° C. However, for other monomers, particularly ethylene, higher temperatures appear to be optimum, say from 50 to 75° C. for ethylene. Temperatures ranging up to 150° C. and higher are generally satisfactory for Ziegler type polymerization.

The pressure at which the polymerization is carried out is dependent upon the chosen monomer or monomers, as well as other variables. In most instances, the polymerization is suitably carried out at atmospheric pressure or higher. Subatmospheric pressures are permissible. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and, in some instances, on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from excessive contact with such materials. An excess of the aluminum compound tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material. It is desirable to protect the catalyst during preparation, storage, and use by blanketing with an inert gas, e.g., nitrogen, argon or helium.

The monomer or mixture of monomers is contacted with the catalyst in any convenient manner, preferably by bringing the catalyst and monomer together with intense agitation provided by suitable stirring or other means. The agitation can be continued during the polymerization, or in some instances, the polymerization mixture can be allowed to remain quiescent while the polymerization takes place. In the case of the more rapid reactions with the more active catalyst, means can be provided for refluxing monomer and solvent if any of the latter is present, and thus remove the heat of reaction. In any event, adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature; or by passing the reaction medium through an equilibrium overflow reactor, or a series of the same.

The polymer will be recovered from the total reaction mixture by a wide variety of procedures, chosen in accordance with the properties of the particular polymer, the presence or absence of solvent, and the like. It is generally quite desirable to remove as much catayst from the polymer as possible, and this is conveniently done by contacting the total reaction mixture or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is an advantageously precipitated by admixture of the solution with a nonsolvent, such nonsolvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The foregoing principles and procedures can be applied, with suitable modifications when necessary, to reactions other than polymerizations, effected in the presence of Ziegler catalysts modified with an acid in accordance with the present invention.

The following examples illustrate certain embodiments of the invention.

*Example 1*

In a 2-liter Morton flask with turbine agitation at 2100 r.p.m., titanium tetrachloride dissolved in kerosene was added to aluminum triisobutyl dissolved in kerosene in amounts to obtain Al/Ti atomic ratio of 0.5. The total charge of kerosene was 1 liter and the concentration of catalyst was 20 mmoles/liter on the basis of titanium. After the catalysts had aged 12 minutes, anhydrous hydrogen chloride was introduced, and then 3 minutes later ethylene was fed to the polymerization conducted at 70° C. The results below illustrate the effect of the hydrogen chloride upon the polymerization and upon the properties of the resulting polyethylene by comparison with a similar run in the absence of added hydrogen chloride.

| HCl mmoles | $C_2H_4$ grams | Yield grams | Density, grams/cc. | Ten. Strength, Yld./Brk., p.s.i. | Ten. Elong., Yld./Brk., Percent | Melt Index/ Percent Recovery | Spec. Viscosity | Impact, ft.-lb. |
|---|---|---|---|---|---|---|---|---|
| 0 | 129 | 124 | 0.9432 | 3,302/1,885 | 15/592 | 0.22/54 | 0.197 | 0.974 |
| 20 | 105 | 57 | 0.9466 | 3,658/1,624 | 15/280 | 3.4/41 | 0.113 | 0.60 |
| 50 | 135 | 117 | 0.9445 | 3,521/1,557 | 19/171 | 4.2/49 | 0.107 | 0.52 |

It will be noted from the above data that the presence of hydrogen chloride caused the production of lower molecular weight, higher melt index polymer, and that this effect was more pronounced with greater amounts of hydrogen chloride. It is also noteworthy that the increase in melt index is proportionally greater than the loss in impact strength. The density of the polymer produced in the presence of 50 millimoles of hydrogen chloride was no greater than that of the polymer produced in the presence of 20 millimoles of hydrogen chloride, thus providing a procedure for lowering molecular weight without raising density. The hydrogen chloride can be added to either the aluminum compound or the titanium compound prior to catalyst formation.

The impact strength of the polyethylene was determined by the Izod impact test which measures the energy necessary to break a notched specimen of the polymer when struck by a metal pendulum (ft.-lbs./inch of notch). The flow properties were determined (ASTM D–1238–52T) by forcing a molten polymer at a temperature of 190° C. through a small orifice and reported as the melt index, i.e., the extrusion rate in grams polymer per 10 minutes (decigrams/minute). The percent recovery is a measure of the increase in diameter of the extruded polymer following its extrusion through the orifice. The specific viscosity of the polymer which is an indicator of molecular weight, was determined on a solution of 0.1 weight percent polymer in xylene at 100° C.

*Example 2*

Triisobutylaluminum and titanium tetrachloride were mixed in i-octane solvent in amounts to provide about a 0.6/1. mole ratio of Al/Ti and a concentration of 10 millimoles/liter based on titanium. The catalyst was permitted to age for 10 minutes and then concentrated sulfuric acid (95%) was added. The catalyst was permitted to age an additional 5 minutes and ethylene was then admitted and polymerized. The conditions and results of two runs employing different amounts of sulfuric acid, along with a control run, are set forth below:

| Atomic Al/Ti | Ratio H+/Ti* | Pressure (p.s.i.) | Time (min.) | $C_2H_4$ (grams) | Yield (grams) | Density (grams/cc.) | Melt Index/ Percent Recovery | Impact (ft.-lb.) | Spec. Viscosity |
|---|---|---|---|---|---|---|---|---|---|
| .619 | 1.11 | 15 | 50 | 134 | 125 | .9457 | .39/74 | 0.98 | 0.181 |
| .599 | 1.96 | 15–50 | 60 | 132 | 94 | .9484 | 2.4/67 | 0.61 | 0.118 |
| .596 | 0 | 5 | 60 | 95 | 91 | .9447 | .16/68 | 0.78 | 0.184 |

*The concentration of H + was calculated on the basis of 100% $H_2SO_4$.

It will be noted from the data that molecular weight decreases sharply, as measured by increase in melt index and decrease in viscosity, with increase in the ratio of sulfuric acid to titanium. There is little or no increase in density with sulfuric acid modifier.

What is claimed is:

1. In the polymerization of alpha-olefins of 2 to 10 carbon atoms over catalyst prepared by the interaction of (a) an aluminum compound of the general formula $R_2AlX$ wherein R is selected from the group consisting of alkyl, cycloalkyl, and aryl radicals and X is selected from the group consisting of hydrogen, halogen, alkyl, cycloalkyl and aryl radicals, with (b) a metal halide:

$$MeX_n$$

in which Me represents a metal of the beta-subgroups of Groups IV to VI, X represents halogen, and $n$ represents the valence of the metal, the improvement which comprises utilizing such catalyst also comprising hydrochloric acid which has been added prior to contact with the alpha-olefins to effect control of the molecular weight of the resulting polyethylene, the amount of acid being within the range of 0.1 to 10 gram-equivalents per gram-atom metal in said metal halide.

2. A polymerization method comprising polymerizing ethylene in the presence of catalyst comprising trialkylaluminum and titanium tetrachloride reaction product and in addition hydrochloric acid which has been included prior to contacting the ethylene, the atomic ratio of aluminum to titanium being in the range of 0.3 to 0.8, and the amount of acid being sufficient to cause production of substantially lower molecular weight polymer than would be produced in its absence, but not such as to prevent the polymerization.

3. A polymerization method comprising polymerizing ethylene in the presence of catalyst comprising triisobutylaluminum and titanium tetrachloride reaction product and in addition hydrogen chloride, all of said catalyst components being intermixed prior to contacting with ethylene the atomic ratio of aluminum to titanium being in the range of 0.3 to 0.8, and the amount of hydrogen chloride being about 0.5 to 3 gram-equivalents per gram-atom of titanium.

4. The method of claim 1 in which the aluminum compound is trialkylaluminum.

5. The method of claim 1 in which the acid is added directly to the catayst prior to the polymerization.

6. The method of claim 2 in which hydrogen chloride is employed in about 0.5 to 3 gram-equivalents per gram-atom of titanium.

References Cited by the Examiner

UNITED STATES PATENTS

| 2,912,425 | 11/1959 | Bailey et al. | 260—94.9 |
| 3,161,628 | 12/1964 | Dost et al. | 260—94.9 |

FOREIGN PATENTS 1,140,768  3/1957  France.

OTHER REFERENCES

Derwin, Belgium Patent Reports, No. 51B, p. C–6, Belgium Patent 570,049, first half of February 1959.

JOSEPH L. SCHOFER, Primary Examiner.

BEN E. LANHAM, LEWIS GOTTS, LESLIE H. GASTON, LEON J. BERCOVITZ, MORRIS LIEBMAN, WILLIAM H. SHORT, Examiners.

W. J. VAN BALEN, M. B. KURTZMAN, T. D. KERWIN, A. S. COOKFAIR, Assistant Examiners.